United States Patent
Boxberger

(10) Patent No.: US 10,916,896 B1
(45) Date of Patent: Feb. 9, 2021

(54) ELECTRICAL DEVICE CONNECTOR APPARATUS WITH POWER ISOLATION CAPABILITY

(71) Applicant: Frank Dale Boxberger, Scottsdale, AZ (US)

(72) Inventor: Frank Dale Boxberger, Scottsdale, AZ (US)

( * ) Notice: Subject to any disclaimer, the term of this patent is extended or adjusted under 35 U.S.C. 154(b) by 0 days.

(21) Appl. No.: 16/817,324

(22) Filed: Mar. 12, 2020

Related U.S. Application Data

(60) Provisional application No. 62/817,975, filed on Mar. 13, 2019.

(51) Int. Cl.
| | |
|---|---|
| *H01R 13/66* | (2006.01) |
| *H01R 27/02* | (2006.01) |
| *H01R 31/06* | (2006.01) |

(52) U.S. Cl.
CPC ......... *H01R 13/6675* (2013.01); *H01R 27/02* (2013.01); *H01R 31/06* (2013.01)

(58) Field of Classification Search
CPC .................................. H01R 27/02; H01R 31/06
See application file for complete search history.

(56) References Cited

U.S. PATENT DOCUMENTS

| | | | | |
|---|---|---|---|---|
| 9,750,873 | B2 * | 9/2017 | Brown | ............... H01R 13/5224 |
| 2003/0151310 | A1 | 8/2003 | Yu | |
| 2007/0072474 | A1 | 3/2007 | Beasley et al. | |
| 2008/0211311 | A1 | 9/2008 | Chi | |
| 2013/0331778 | A1 * | 12/2013 | Kruse | ............... A61M 5/14244 |
| | | | | 604/66 |

\* cited by examiner

*Primary Examiner* — Tho D Ta
(74) *Attorney, Agent, or Firm* — Plager Schack LLP; Mark H. Plager; Eric Liou

(57) ABSTRACT

A connector apparatus with a power isolation capability that is designed to transmit electricity from a power source to an electrical device is provided. The connector apparatus includes a housing with an input connector designed to electrically couple to the power source and an output connector designed to electrically couple to the electrical device, and a power isolation chip disposed in the housing and having an input electrically coupled to the input connector of the housing and an output electrically coupled to the output connector of the housing. The power isolation chip is designed to isolate its negative and positive output terminals from its negative and positive input terminals, thereby minimizing the generation of interference in the connector apparatus that transfers to the electrical device.

5 Claims, 4 Drawing Sheets

ELECTRICAL DEVICE CONNECTOR APPARATUS WITH POWER ISOLATION CAPABILITY

RELATED APPLICATION

The application claims priority to provisional patent application U.S. Ser. No. 62/817,975 filed on Mar. 13, 2019, the entire contents of which is herein incorporated by reference.

BACKGROUND

The embodiments herein relate generally to connectors and coupling devices for electrical devices. More specifically, embodiments of the invention are directed to an electrical device connector apparatus with a power isolation capability.

Guitar effects pedals, medical devices and other electrical devices are connected to a power source or supply voltage using an electrical connector that transmits power to the device during basic operation and/or charging modes.

Many electrical or electronic devices receive power from an AC 115V or 230V source, but actually operate using DC power. Often times these devices are specific about the type of power that they can accept. For example, devices often can only accept DC, others can only accept AC, and each a specific voltage, e.g., 5V, 9V, 12V, 18 V or 24V. When multiple devices are used together in series or in tandem, the power supplies have the further complication of delivering the correct power and electrical polarity to each device.

Another area of concern in electrical connectors is the generation of undesirable interference, hum, noise and/or signal disruption in the connector that transfers to the electrical device during the supply of power from the power source to the electrical device. This causes the guitar effects pedal, medical device or electrical device to operate inefficiently and/or with unacceptable results.

Several power transfer and/or supply devices exist as disclosed in U.S. Patent Application Publications 2008/0211311, 2007/0072474 and 2003/0151310, which are configured to provide different power conversions and/or voltages from a source to a device. However, these devices are limited in that they do not minimize the transfer of generated interference to the electrical device receiving the supplied power.

As such, there is a need in the industry for an electrical device connector apparatus with a power isolation capability that addresses the limitations of the prior art, which supplies power from a power source to the electrical device. There is a need for the connector apparatus to minimize the generation of any interference, hum, noise and/or signal disruption in the connector that transfers to the electrical device. There is a further need for the connector apparatus to convert the power from the source to the desired voltage necessary to operate the electrical device in the proper electrical polarity.

SUMMARY

In certain embodiments of the invention, a connector apparatus with a power isolation capability that is configured to transmit electricity from a power source to an electrical device is provided. The connector apparatus is configured to minimize the generation of undesirable interference in the connector apparatus that transfers to the electrical device. The connector apparatus comprises a housing comprising an input connector configured to electrically couple to the power source and an output connector configured to electrically couple to the electrical device, and a power isolation chip disposed in the housing and comprising an input and an output, the input of the power isolation chip comprising a negative input terminal electrically coupled to the input connector and a positive input terminal electrically coupled to the input connector, the output of the power isolation chip comprising a negative output terminal electrically coupled to the output connector and a positive output terminal electrically coupled to the output connector, wherein electricity from the power source transmits through the input connector, power isolation chip and output connector to the electrical device, wherein the power isolation chip is configured to isolate the negative and positive output terminals from the negative and positive input terminals, thereby minimizing the generation of interference in the connector apparatus that transfers to the electrical device.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
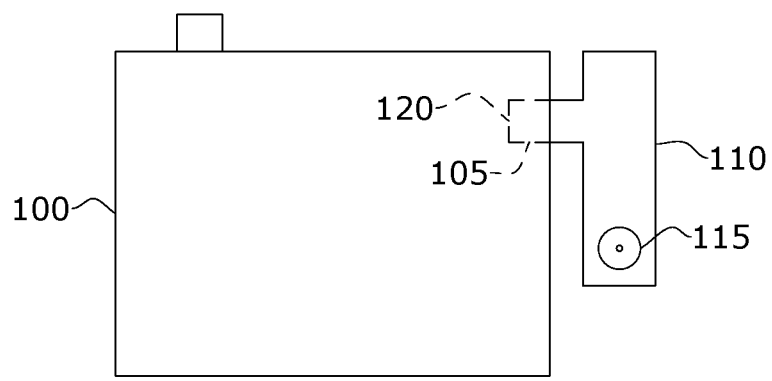
FIG. 1 depicts a schematic view of certain embodiments of the connector apparatus shown connected to a guitar effects pedal.
Figure 2A:
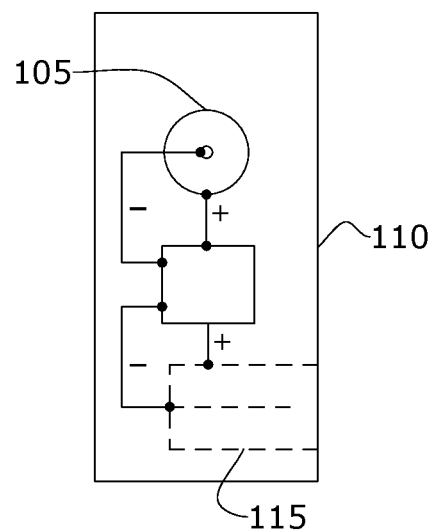
FIG. 2A depicts a front view of certain embodiments of the connector apparatus.
Figure 2B:
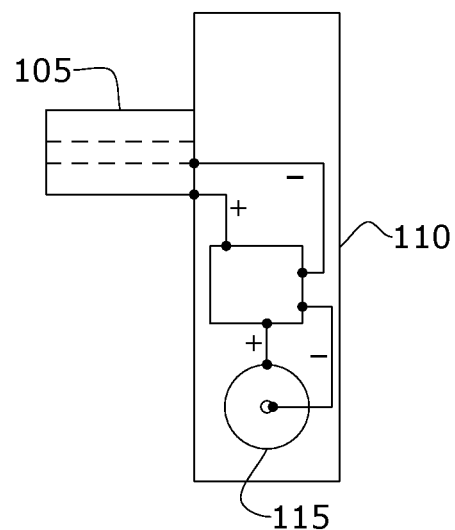
FIG. 2B depicts a side view of certain embodiments of the connector apparatus.
Figure 3:
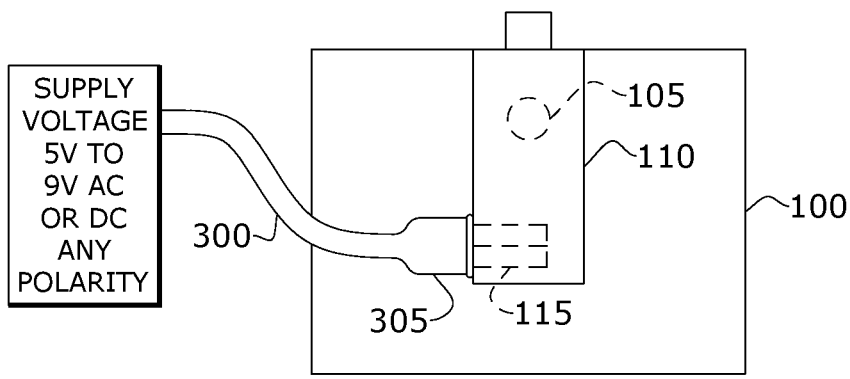
FIG. 3 depicts a schematic view of certain embodiments of the connector apparatus shown in use and connected to a power source.

In certain embodiments of the invention as depicted in FIGS. 1-3, connector apparatus 110 electrically couples to electrical device 100 and is configured to transfer power from a power source to electrical device 100. The power source can be any power supply such as a power outlet, battery, power generator or other source. In one embodiment, electrical device 100 is a guitar effects pedal with input connector 120. However, it shall be appreciated that electrical device 100 can be a medical device or any other type of electronic or electrical device in alternative embodiments.

In one embodiment as depicted in FIGS. 2A-2B, connector apparatus 110 comprises a housing with input connector 115 electrically coupled to output connector 105. Input connector 115 of connector apparatus 110 is configured to electrically couple to the power source. In one embodiment as depicted in FIG. 3, the power source comprises supply voltage wire 300 coupled to supply voltage connector 305, which is configured to electrically couple to input connector 115 of connector apparatus 110. In one embodiment, connector apparatus 110 is configured for use with a power source comprising AC or DC power, with a supply voltage from 3V to 9V. In one embodiment as depicted in FIGS. 1-2, output connector 105 of connector apparatus 110 is configured to electrically couple to input connector 120 of electrical device 100.

In one embodiment, input connector 115 of connector apparatus 110 comprises a female jack and output connector 105 of connector apparatus 110 comprises a 5.5 millimeter cylindrical "cannon" jack. However, it shall be appreciated that input connector 115 and output connector 105 may comprise any alternative types of electrical connectors known in the field to accommodate different power sources and/or electrical devices 100.

Figure 4:
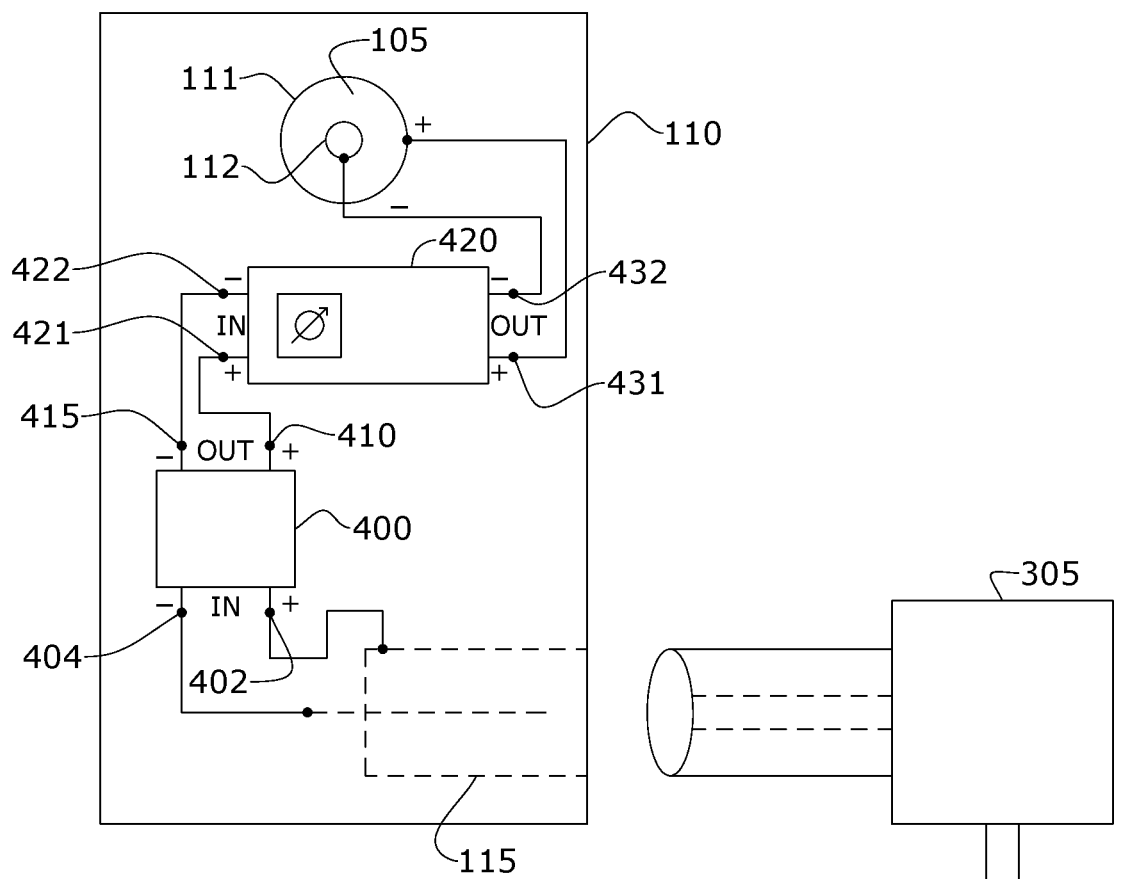
FIG. 4 depicts a schematic view of certain embodiments of the connector apparatus shown in use with an alternative power source.
Figure 5:
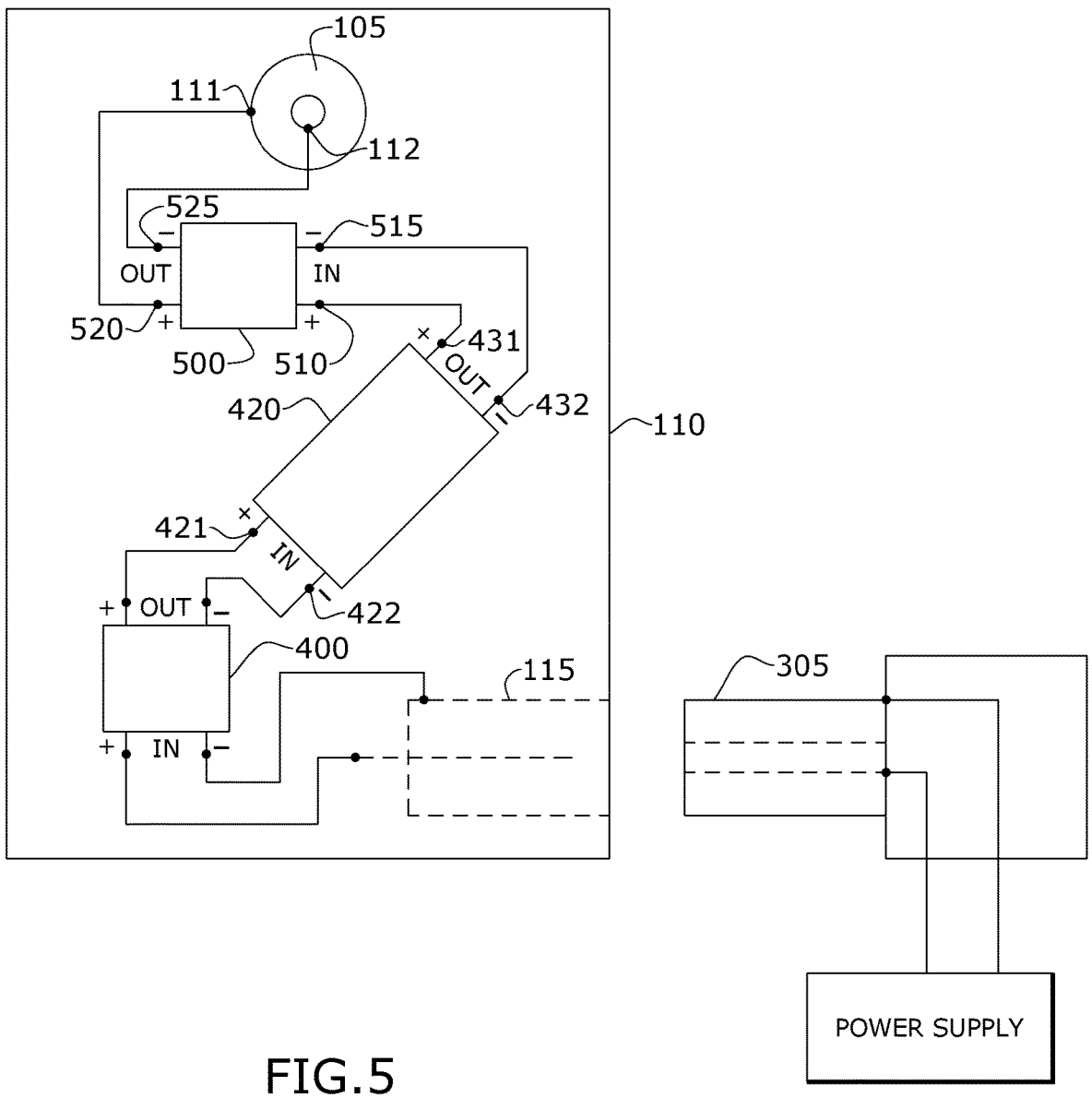
FIG. 5 depicts a schematic view of certain embodiments of the connector apparatus and a power source.

In certain embodiments, connector apparatus 110 comprises one or more components disposed inside the housing and electrically coupled to input connector 115 and output connector 105. In one embodiment as depicted in FIGS. 4-5, connector apparatus 110 comprises bridge rectifier 400 and step-up voltage chip 420. Bridge rectifier 400 comprises bridge rectifier positive input terminal 402 and bridge rectifier negative input terminal 404 electrically coupled to input connector 115 of connector apparatus 110. Bridge rectifier 400 comprises bridge rectifier positive output terminal 410 and bridge rectifier negative output terminal 415. Bridge rectifier positive output terminal 410 is electrically coupled to step-up voltage chip positive input terminal 421 and bridge rectifier negative output terminal 415 is electrically coupled to step-up voltage chip negative input terminal 422. Step-up voltage chip positive output terminal 431 is electrically coupled to output connector positive terminal 111 and step-up voltage chip negative output terminal 432 is electrically coupled to output connector negative terminal 112.

Bridge rectifier 400 is configured to deliver an output with consistent electrical polarity (+ power and − power) that transmits to step-up voltage chip 420 regardless of the electrical polarity at the input of bridge rectifier 400 from the connection between input connector 115 of connector apparatus 110 and supply voltage connector 305 of the power source.

In certain embodiments, step-up voltage chip 420 is configured to increase the input voltage of the chip to the desired output voltage to accommodate electrical device 100. In one embodiment, step-up voltage chip 420 is an IC voltage booster or charge pump. The increase in voltage can vary in different embodiments. In certain embodiments, step-up voltage chip 420 is configured to generate a voltage in the output of the step-up voltage chip within an approximate range of 9V-24V. In certain embodiments, any of the following increases in voltage are permissible through step-up voltage chip 420: (1) 9V in, 12V out; (2) 9V in, 18V out; and (3) 9V in, 24V out.

In one embodiment as depicted in FIG. 5, power isolation chip 500 comprises chip positive input terminal 510, chip negative input terminal 515, chip positive output terminal 520 and chip negative output terminal 525. Chip positive input terminal 510 is electrically coupled to step-up voltage chip positive output terminal 431 and chip negative input terminal 515 is electrically coupled to step-up voltage chip negative output terminal 432. Chip positive output terminal 520 is electrically coupled to output connector positive terminal 111 and chip negative output terminal 525 is electrically coupled to output connector negative terminal 112.

In one embodiment, power isolation chip 500 comprises one or more components that are configured to interrupt ground loops in connector apparatus 110 by isolating chip positive and negative output terminals 520, 525 of power isolation chip 500 from chip positive and negative input terminals 510, 515 of power isolation chip 500. This greatly minimizes the generation of interference, hum, noise and/or signal disruption in connector apparatus 110 that transfers to electrical device 100.

In the case where electrical device 100 is a guitar effects pedal, minimizing any interference in the pedal prevents the addition of undesirable disturbances and/or noise to the musical output generated in the guitar effects pedal. It shall be appreciated that the isolated circuit in connector apparatus 110 can include any components such as diodes, resistors, capacitors or other electrical components in alternative embodiments.

Figure 6:
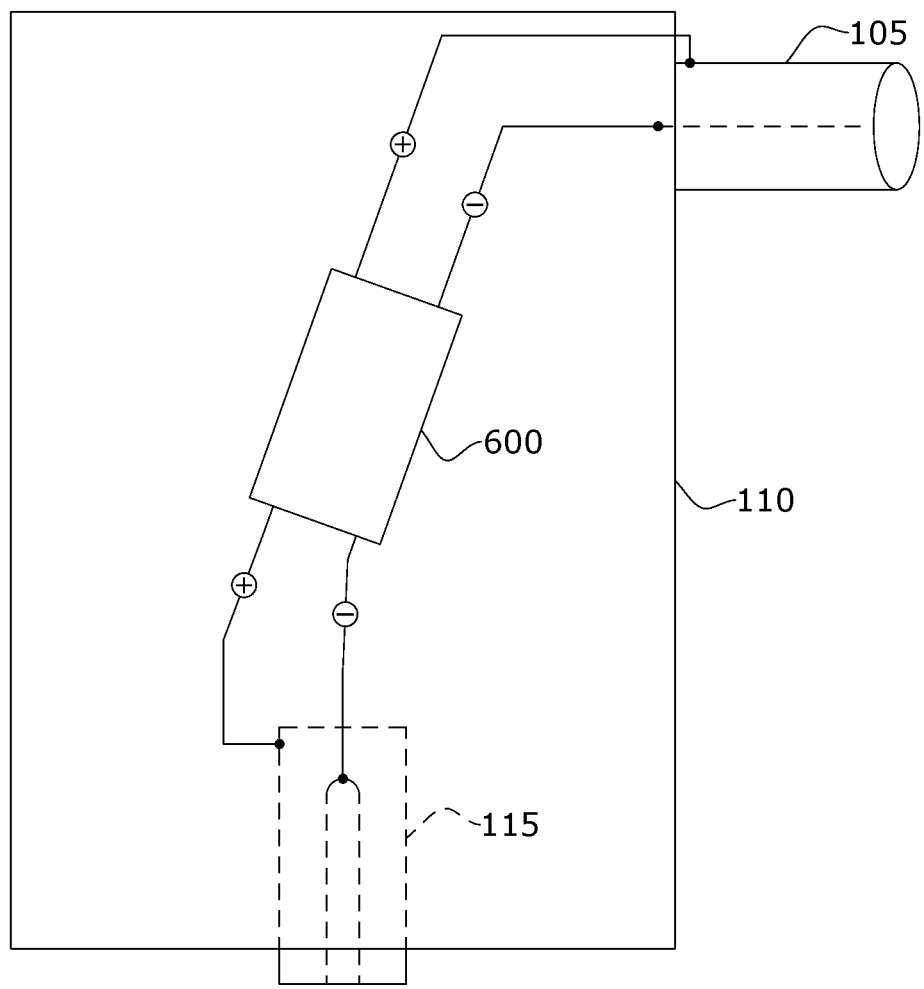
FIG. 6 depicts a schematic view of certain embodiments of the connector apparatus and a power source.
Figure 6:
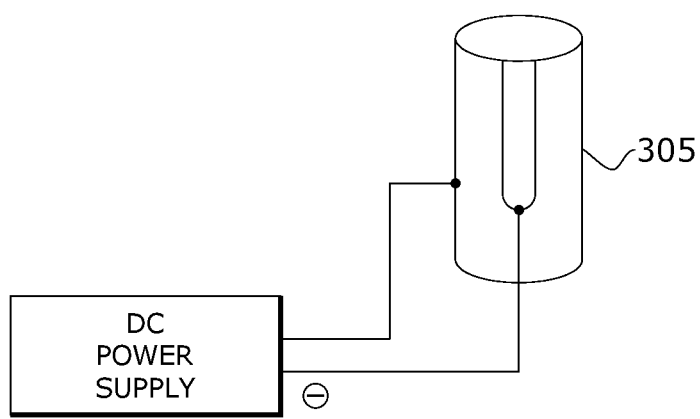

In an alternative embodiment as depicted in FIG. 6, the components of step-up voltage chip 420 and power isolation chip 500 are combined in a single device such as step-up voltage and power isolation chip 600. Step-up voltage and power isolation chip 600 is electrically coupled to input connector 115 and output connector 105 in connector apparatus 110.

It shall be appreciated that the components in connector apparatus 110 can vary. In one embodiment, connector apparatus 110 comprises solely power isolation chip 500 electrically coupled to input connector 115 and output connector 105. In one embodiment, connector apparatus 110 comprises step-up voltage chip 420 and power isolation chip 500 both electrically coupled to input connector 115 and output connector 105. In one embodiment, connector apparatus 110 comprises bridge rectifier 400, step-up voltage chip 420 and power isolation chip 500 electrically coupled to input connector 115 and output connector 105. In one embodiment, connector apparatus 110 comprises bridge rectifier 400 and power isolation chip 500 both electrically coupled to input connector 115 and output connector 105. These variations in design of connector apparatus 110 help to accommodate different user requirements and electrical devices 100.

In operation, connector apparatus 110 as depicted in FIGS. 1 and 5 is electrically coupled to both the power source and electrical device 100. The supply voltage from the power source can be anywhere within the range of 3V-9V AC or DC power with any electrical polarity in one embodiment.

In certain embodiments, electricity from the power source transmits through input connector 115, bridge rectifier 400, step-up voltage chip 420, power isolation chip 500 and output connector 105 to electrical device 100. Connector apparatus 110 provides power to electrical device 100 with the desired voltage and electrical polarity regardless of the electrical polarity in the connection between supply voltage connector 305 and input connector 115 of connector apparatus 110. Connector apparatus 110 at the same time minimizes the transfer of any interference, hum, noise and/or signal disruption in connector apparatus 110 that transfers to electrical device 100.

It shall be appreciated that the components of the connector apparatus described in several embodiments herein may comprise any alternative known materials in the field and be of any color, size and/or dimensions. It shall be appreciated that the components of the connector apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A connector apparatus with a power isolation capability that is configured to transmit electricity from a power source to an electrical device, the connector apparatus configured to minimize the generation of undesirable interference in the connector apparatus that transfers to the electrical device, the connector apparatus comprising:
 a housing comprising an input connector configured to electrically couple to the power source and an output connector configured to electrically couple to the electrical device;
 a power isolation chip disposed in the housing and comprising an input and an output, the input of the power isolation chip comprising a negative input terminal and a positive input terminal, the output of the power isolation chip comprising a negative output terminal electrically coupled to the output connector and a positive output terminal electrically coupled to the output connector; and
 a step-up voltage chip disposed in the housing and comprising an input electrically coupled to the input connector of the housing and an output electrically coupled to the negative and positive input terminals of the power isolation chip;
 wherein electricity from the power source transmits through the input connector, step-up voltage chip, power isolation chip and output connector to the electrical device, wherein the power isolation chip is configured to isolate the negative and positive output terminals from the negative and positive input terminals, thereby minimizing the generation of interference in the connector apparatus that transfers to the electrical device.

2. The connector apparatus of claim 1, wherein the step-up voltage chip is configured to generate a voltage in the output of the step-up voltage chip within an approximate range of 9 V-24 V.

3. The connector apparatus of claim 2, wherein the step-up voltage chip is an IC voltage booster.

4. The connector apparatus of claim 2, wherein the step-up voltage chip is a charge pump.

5. The connector apparatus of claim 2, further comprising a bridge rectifier disposed in the housing and comprising an input electrically coupled to the input connector of the housing and an output electrically coupled to the input of the step-up voltage chip.

* * * * *